UNITED STATES PATENT OFFICE.

HERMANN ENDEMANN, OF BROOKLYN, ASSIGNOR TO FRANKLIN D. NEWTON, OF QUEENS, NEW YORK.

TREATING AND BLEACHING RATTAN.

SPECIFICATION forming part of Letters Patent No. 343,896, dated June 15, 1886.

Application filed April 15, 1886. Serial No. 198,999. (Specimens.)

*To all whom it may concern:*

Be it known that I, HERMANN ENDEMANN, a citizen of the United States, residing at Brooklyn, in the county of Kings and State of New York, have invented new and useful Improvements in Treating and Bleaching Rattan, of which the following is a specification.

My invention consists in an improved process for removing the silex or enamel from rattan, bleaching the same after removing the silex or enamel, and subsequently dyeing the rattan, my process being such that the rattan retains its full pliability or elasticity after the treatment.

In carrying out my invention it is first necessary to remove the enamel or silex from the surface of the rattan. For this purpose I prepare a solution of a soap, such as hereinafter described, into which the rattan is immersed and boiled until the silex or enamel is removed to the desired extent, which occupies a period of time varying from one and one-half to two and one-half hours. The rattan is inspected from time to time during the process, so as to determine the proper time for removal. The soap which I use contains a considerable excess of free caustic soda.

In preparing the solution of soap above mentioned I dissolve one part of commercial caustic soda in about one hundred parts of water, and saponify with this solution one-half part, by weight, of commercial oleic acid; or, in place of oleic acid, other fatty substances can be used—such as tallow or the fatty acids of tallow or cocoa-butter.

Prior to treating the rattan with this caustic solution, it may be soaked in boiling water for some time, or it may be immersed in the solution in a dry state, (commercially dry.) By the action of this solution the silex or enamel covering the rattan is dissolved, and at the same time the rattan remains pliable, which is due particularly to the presence of the fatty substances contained in the soap. After the treatment with the silex or enamel solvents the rattan has assumed a brown color of varying shades, which may be removed by a bleaching agent. Before subjecting the rattan to a bleaching process the soap-solution is drawn off, and the rattan is soaked in cold water for ten or twelve hours and then thoroughly washed, this step being necessary to remove all traces of the soap.

For bleaching the rattan I make use of oxidizing agents, such as peroxide of hydrogen or a mixture of chromic acid and sulphuric acid in solution, or chloride of lime or other hypochlorites, the last-named agents being used by preference, since they are cheap and very serviceable, and so effective that the rattan may be bleached so as to present a nearly or even perfectly white appearance.

By preference I employ a bleaching solution obtained as follows: One hundred parts of chloride of lime are treated with cold water, and the soluble chloride and hypochlorite are separated from the calcium hydrate by filtration. To the filtrate are added one hundred and thirty parts of commercial magnesium sulphate dissolved in cold water, and the precipitated sulphate of lime is filtered off and washed until two thousand five hundred parts of a solution containing chloride of magnesium and hypochlorite of magnesium are obtained. The rattan is submerged in this bleaching-solution for from one to four hours, and is then removed and soaked in water from ten to twelve hours. The water is then drawn off, and it is boiled for a short time with a weak solution of boric acid in water, to decompose any remaining chloride, after which it is again soaked, to remove all chemicals, and is finally dried.

As before stated, the rattan leaves the soap-solution in shades varying from a light to a comparatively dark brown. For the darker pieces the bleaching-liquor is used in its full strength; but for the lighter-colored pieces it must be diluted, or a partly-spent liquor may be used.

If after the completion of the bleaching process the rattan is found to be white, and it is desired to restore its natural color, it can be dyed by immersion for a short time in a very dilute hot solution of Bismarck brown and phosphine until the desired color is obtained. For other shades other well-known dyes can be used, as the rattan is then in a condition to be dyed with acid as well as basic colors by well-known methods.

The dyeing process may be carried out in the whole piece or after the rattan has been sliced.

What I claim as new, and desire to secure by Letters Patent, is—

1. The process of removing the enamel or silex from rattan, which consists in exposing the rattan to the action of a solution of soap, substantially as set forth.

2. The herein-described process for bleaching rattan, which consists in first removing the enamel or silex, and then treating the rattan with an oxidizing-solution, such as a solution of chloride of lime.

3. The herein-described process of treating rattan, which consists in first treating the rattan with a solution of soap, then bleaching the same with an oxidizing-solution, such as a solution of the hypochlorite of magnesium, and finally immersing the bleached rattan in a dye.

4. The herein-described process for treating rattan, which consists in first removing the enamel or silex by treating the rattan with a solution of soap, then bleaching the same with an oxidizing-solution, such as a solution of chloride of lime, then washing, and finally boiling with a solution of boric acid in water.

5. A stick or slip of rattan which is first freed from silex, then bleached, as set forth.

6. A stick or slip of rattan which is first freed from silex, then bleached, and finally dyed, as set forth.

In testimony whereof I have hereunto set my hand and seal in the presence of two subscribing witnesses.

HERMANN ENDEMANN. [L. S.]

Witnesses:
W. HAUFF,
E. F. KASTENHUBER.